Nov. 4, 1969  J. F. WALTON  3,477,020
DYNAMIC IMPEDANCE ANALYZER INCLUDING SYNCHRONOUS PHASE DETECTOR
Filed Sept. 15, 1967  8 Sheets-Sheet 1

INVENTOR
JOHN F. WALTON

BY Stevens, Davis, Miller & Mosher
ATTORNEYS

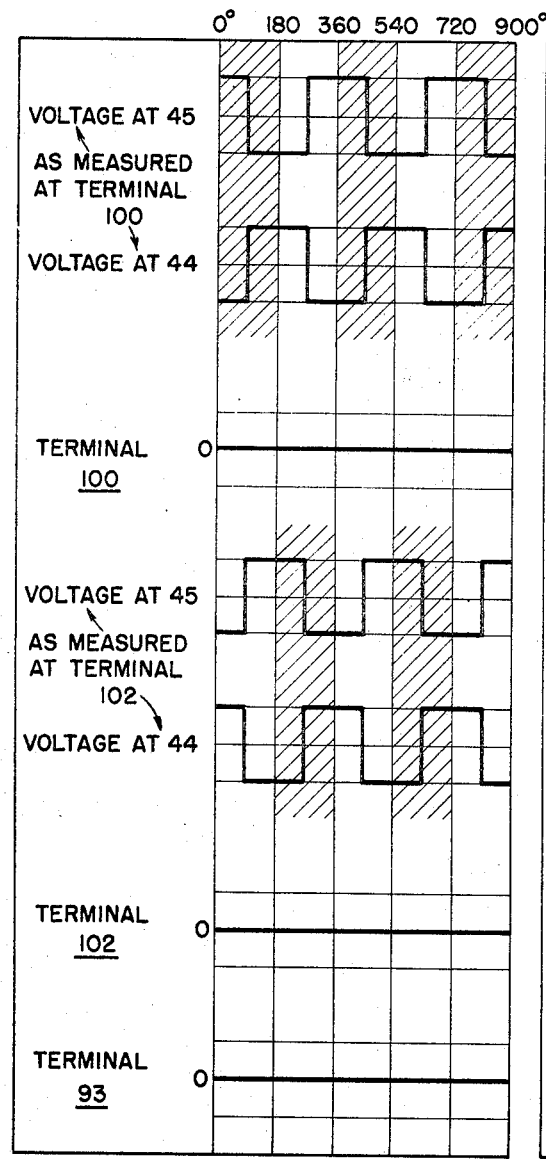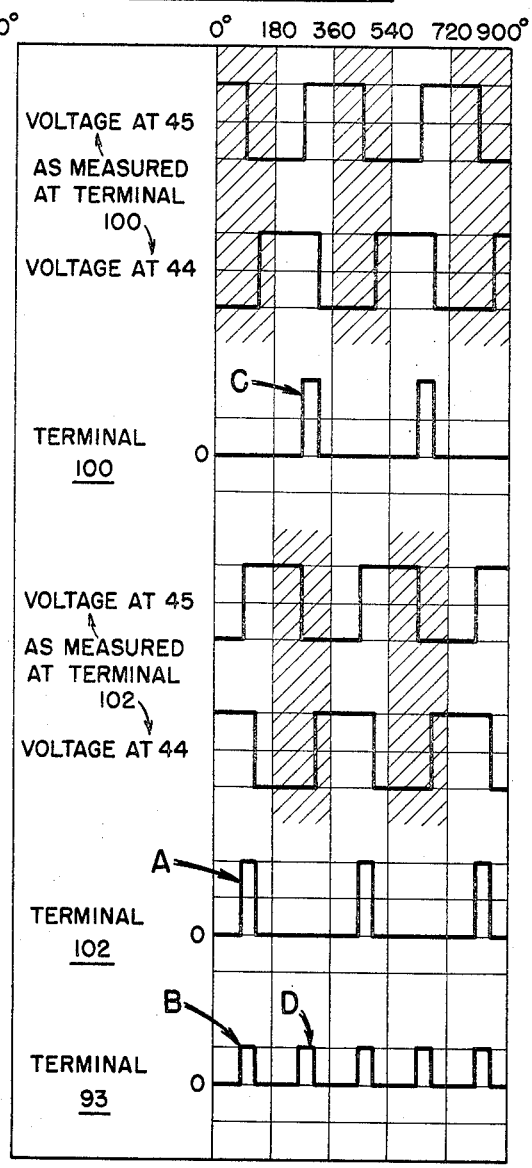

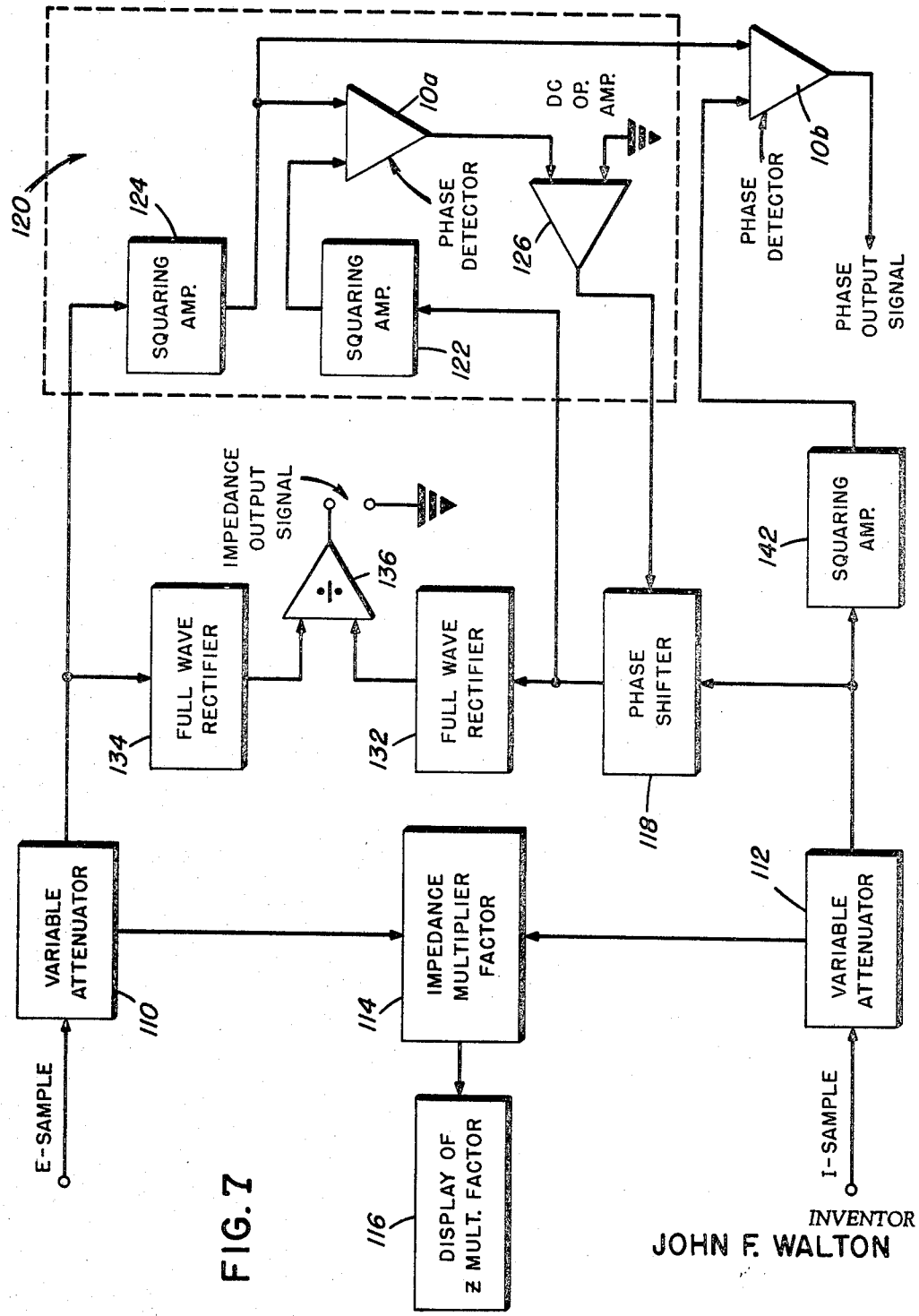

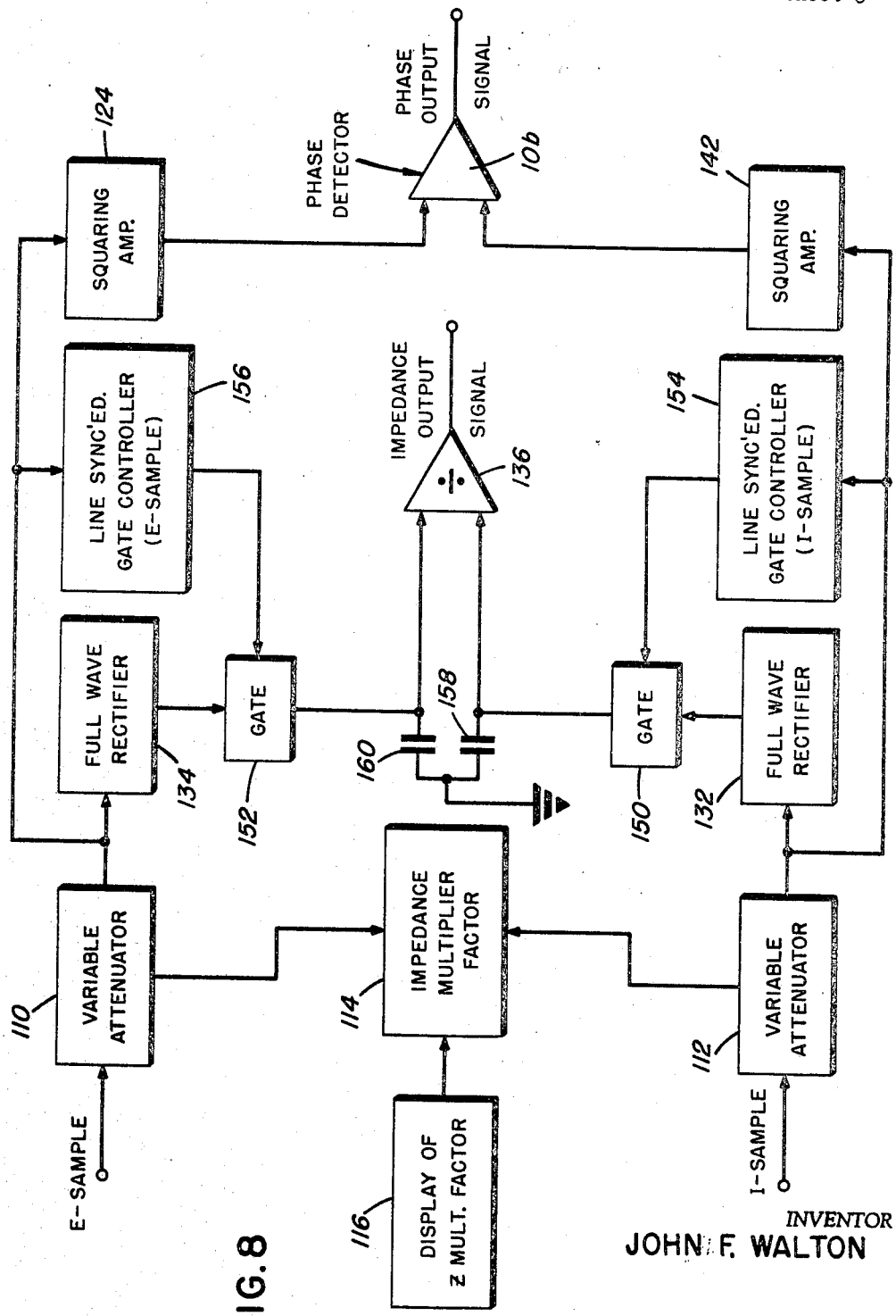

United States Patent Office 3,477,020
Patented Nov. 4, 1969

3,477,020
DYNAMIC IMPEDANCE ANALYZER INCLUDING
SYNCHRONOUS PHASE DETECTOR
John F. Walton, McLean, Va., assignor to Halliburton
Company, Duncan, Okla., a corporation of Delaware
Filed Sept. 15, 1967, Ser. No. 668,146
Int. Cl. G01r 27/00, 25/00; H03d 13/00
U.S. Cl. 324—57                                          5 Claims

ABSTRACT OF THE DISCLOSURE

A dynamic impedance analyzer including an analog divider and a synchronous phase detector. The analog divider receives sampled voltage and current signals shifted to be in phase when arriving at the divider. An indicator connected to the output of the divider indicates the absolute value of the test impedance. The synchronous phase detector also receives the sampled signals after an amplifier stage has amplified and clipped the signals. These signals are delivered with opposite sign across a voltage divider to a storage capacitor controlling a meter indication. The meter indicates the sign and magnitude of the phase deviation between the sampled signals.

BACKGROUND OF THE INVENTION

The present invention relates to a new and improved synchronous phase detector capable of indicating the magnitude and sign of relative current-voltage phase displacement between sampled alternating current and voltage signals.

It is a purpose of the present invention to provide an improved synchronous detector with capability of indicating the sign of the phase displacement and rendering an indication of an exact inphase relationship without calibration. The synchronous phase detector furthermore provides a full wave synchronous rectification to provide a fast response time and, unlike conventional synchronous phase detectors, the invention includes bifilar transformer designs coupling the sampled signals to the detector stage to insure without the need for center tap transformer secondaries the same exact turn number necessary to keep sampled voltage and current signals at the same amplitude.

It is therefore a primary object of the present invention to provide a new and improved synchronous phase detector per se and in combination with a new and improved impedance analyzer.

DETAILED DESCRIPTION OF EMBODIMENTS

Other and further objects of the invention will become apparent with the following detailed description thereof when taken in view of the appended drawings in which:

FIGURES 1A and 1B are schematic diagrams of one example of the synchronous detector of the invention.

FIGURES 2 and 3 diagrammatically illustrate the various signal wave forms developed in the synchronous phase detector. The shaded areas represent blanking periods during which various terminals are shorted to ground.

FIGURES 7 and 8 are block diagrams of further embodiments of the dynamic impedance analyzer.

Figure 1A:
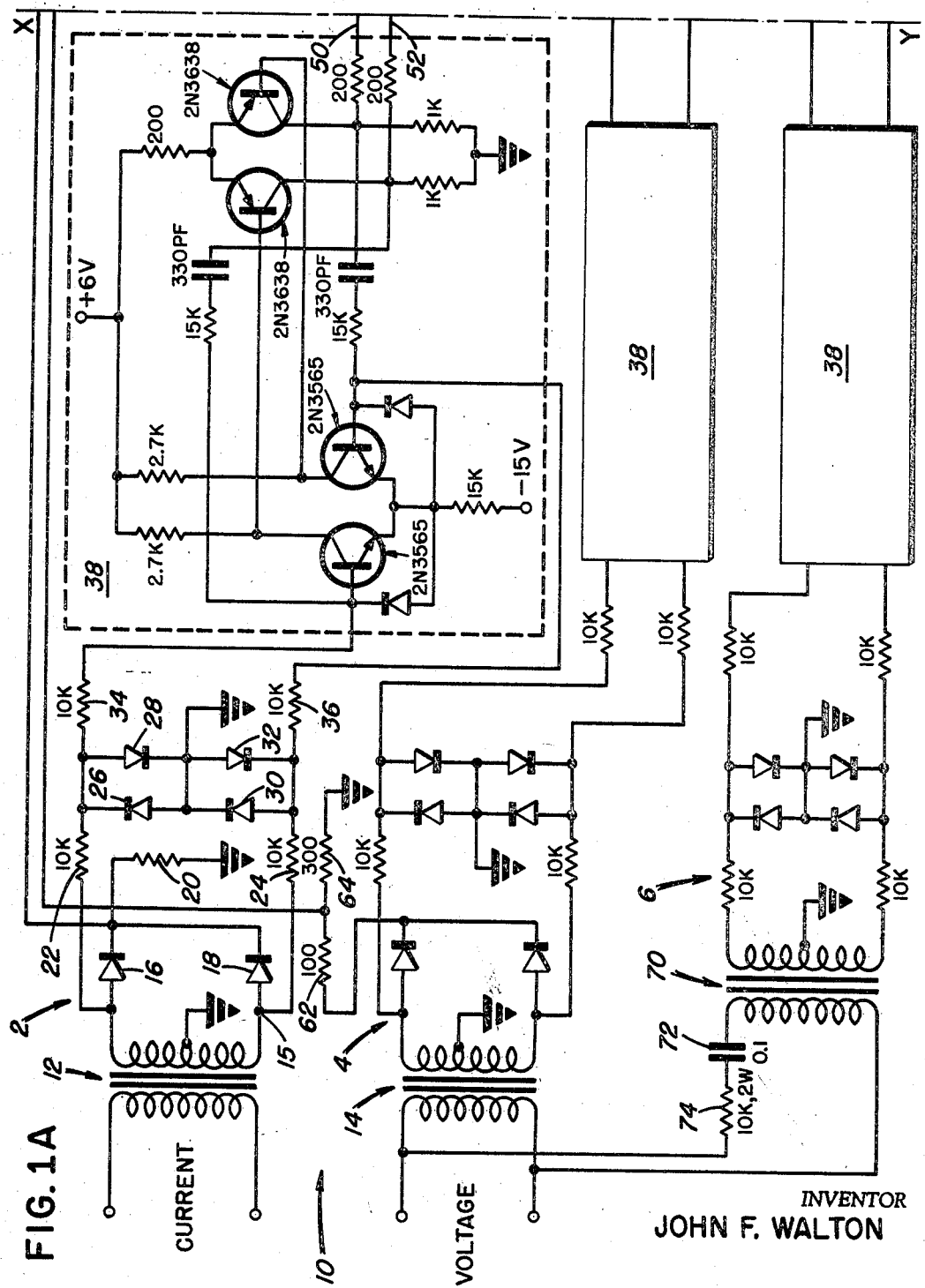
Figure 1B:
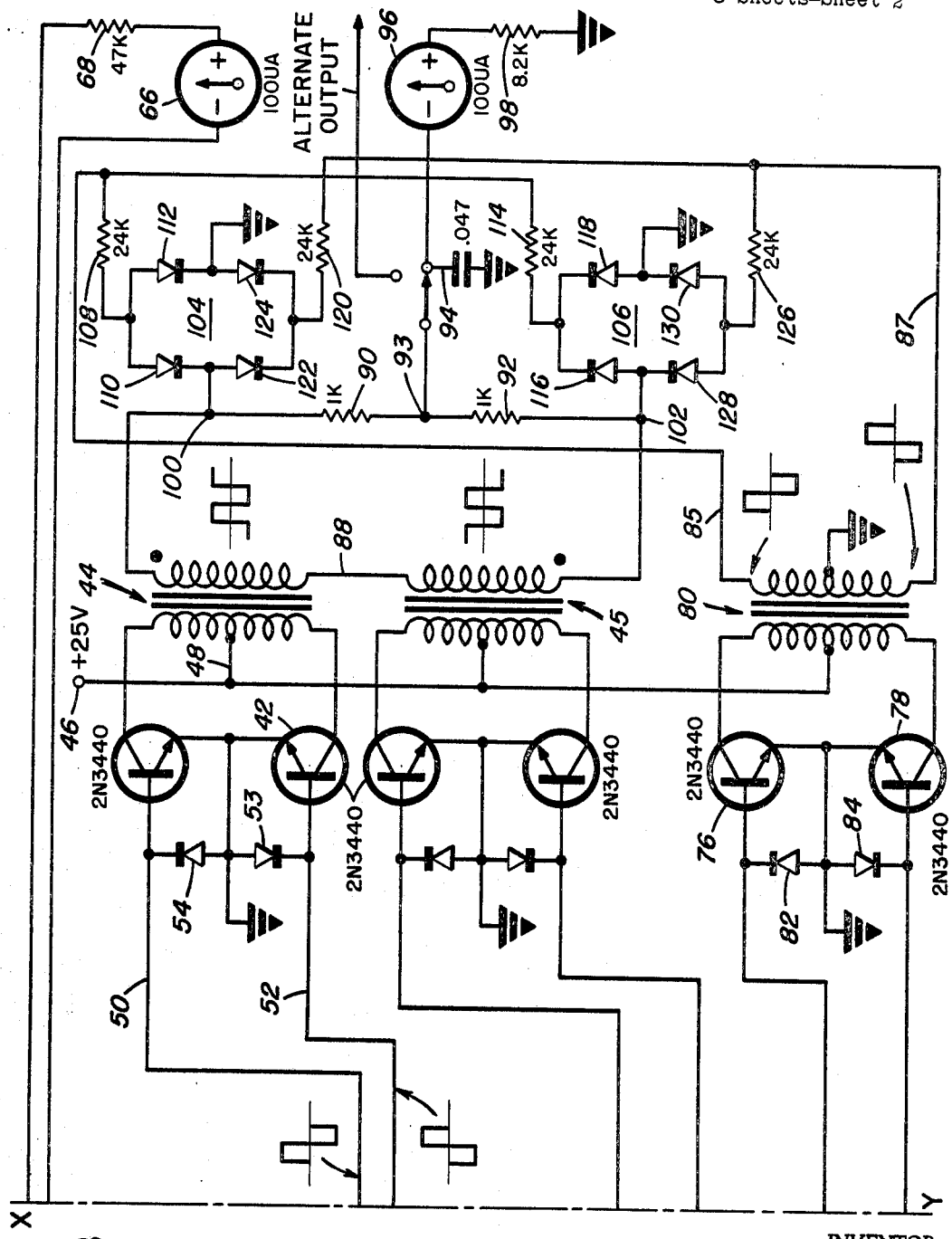

With reference to FIGURE 1 a synchronous phase detector generally indicated as 10 according to the invention includes three signal channels 2, 4 and 6 having channel input transformers 12, 14 and 70. In this example, a signal representing line current can be fed to the primary of transformer 12 and the line voltage signal can be applied to transformer 14. In channel 2, the secondary of transformer 12 is center tapped to ground and has its end terminals connected together through relatively high value resistors 22 and 24 to ground through parallel and oppositely poled diodes 26, 28 and 30, 32. Diodes 26–32 conduct with 0.5 volt so that the resulting signal is clamped at plus and minus 0.5 volt. The signals developed across dides 26–32 are fed through resistors 34 and 36 to an amplifier-clipper stage 38 which is conventional in design and produces at its outputs square waves of constant amplitude and period depending upon input signal to transformer 12. The square wave from amplifier 38 applied to a switching arrangement including transistors 40 and 42 having their emitters connected together and their collectors connected in series through the primary winding of a bifilar wound 5:1 stepdown transformer 44. A positive voltage source 46 is connected to a primary winding center tap 48. Output lead 50 of amplifier 38 is connected to the base of transistor 40 and output lead 52 is connected to the base of transistor 42. Diodes 53 and 54 are connected from outputs 50 and 52 to ground and poled to clip negative signals appearing on output 50 and 52. With this arrangement, transistors 40 and 42 are alternately switched on the axis crossing of the signals at outputs 50 and 52. In this way, the current path from power supply 46 to ground is alternately completed through opposite halves of the transformer primary so as to generate on the secondary winding a constant amplitude square wave having a period equal to that of the incoming sampled signal.

As can be seen in FIGURE 1, channel 4 is similar in design to the one already described. The stages of channel 4 thereby develop a constant amplitude square wave signal at the secondary of transformer 45 with the same period as the signal arriving at transformer 14. Since the two sampled signals represent line voltage and current, the signals across the secondaries of transformers 44 and 45 have the same period. These signals also have the same amplitude by virtue of the identical transformer designs.

To indicate the presence and relative amplitude of signals at transformers 12 and 14, diodes 16 and 18 are connected generally as shown between terminals 13 and 15 for each transformer 12 and 14. Resistors 20, 62 and 64 connected from respective diodes to ground develop voltage signals whenever signals appear at the associated transformer secondary. A current meter 66 is connected through resistor 68 to the connected terminals of diodes 16 and 18 and to the junction of series resistors 62 and 64. By observing meter 66, the operator will know immediately when the phase detector is receiving signals of suitable amplitude.

Assuming the signal applied to transformer 14 and channel 4 is designated a reference signal, the same signal is fed to transformer 70 after it has been shifted substantially 90° by series capacitance 72 and resistor 74 in combination with the primary impedance of transformer 70. As will become evident, the phase shifting of the reference signal exactly 90° is not critical since the magnitude of shift merely affects the range and not the accuracy of the phase detector. The switching arrangement for transformer 80 in this channel includes transistors 76 and 78 each with diodes 82 and 84 connected from their bases to ground and poled to clip the negative signals applied to the respective bases. Unlike transformers 44 and 45, the secondary of transformer 80 may be center tapped to ground. Therefore, signals developed at the secondary of transformer 80 are constant amplitude square wave pulses having the same period as the sampled signal arriving at transformer 14 but shifted substantially 90°. Furthermore, as the square wave pulse at lead 85 goes positive, the square wave pulse at lead 87 goes negative relative to ground.

Lead 88 connects appropriate terminals of transformers 44 and 45 so that they produce oppositely phased signals for inphase signals applied to transformers 12 and 14. The other terminals are connected through a voltage divider formed by resistors 90 and 92 having equal values. A storage capacitor 94 may be connected to the junction of resistors 90 and 92 and to ground and controls a zero center ammeter 96 the current path of which is completed to ground through resistor 98. If desired, capacitor 94 and ammeter 96 may be omitted and a different means of digital or visual readout substituted to receive pulsed signals from terminal 93.

A pair of synchronous diode rectifier stags 104 and 106 are coupled to the secondary of transformer 82 and synchronously apply an open circuit or ground potential to terminals 100 and 102, respectively. To actuate stages 104 and 106, transformer 80 terminal 85 is connected through resistor 108 to the positive electrodes of diodes 110 and 112 the former being connected to terminal 100 and the latter being connected to ground. Lead 85 is furthermore connected through resistor 114 to the negative electrodes of diodes 116 and 118, the former being connected to terminal 102 and the latter being connected to ground. Similarly, transformer terminal 87 is connected through resistor 120 to the negative electrodes of diodes 122 and 124 and through resistor 126 to the positive electrode of diodes 128 and 130.

The operation of the synchronous phase detector will now be described with reference to FIGURES 2 and 3. The manner in which the square wave voltage pulses are developed on the secondaries of transformers 44, 45 and 80 is clear from the foregoing. It will be appreciated that the invention can operate off of any suitable sampled frequency, such as 50, 60 and 400 cycles.

With the sampled signals in phase, the signals occur across the secondaries of transformers 44 and 45 as represented in FIGURE 2. The shaded areas in these figures represent the times during which the synchronous phase rectifier stages 104 and 106 are actuated to place ground potentials respectively on terminals 100 and 102. It can be seen from FIGURE 2 that if the square wave voltage signals at the secondaries of transformers 44 and 45 are in phase, there is a total signal cancellation so as to provide zero volts at terminals 100 and 102 during the alternate time periods when the synchronous rectifier stages 104 and 106 are not actuated. Therefore, the output 93 of the voltage divider remains at the zero level so as to provide a net zero charge on capacitor 94 which maintains a zero reading on meter 96.

Assuming now that the signal arriving at transformer 12 lags the signal arriving at transformer 14, the condition at the phase detector stage is as represented in FIGURE 3. During the first 180°, rectifier stage 104 is actuated to place ground at terminal 100. However, rectifier stage 106 is in the open condition. From zero to 90° the voltages across secondaries of transformer 44 and 45 cancel each other so that the voltage at terminal 102 continues to be zero volts. However, at 90° the voltage at transformer 45 changes from minus to plus while the voltage at transformer 44 continues to remain plus due to the phase lag of this signal. When both voltages are of the same sign, they add algebraically and provide a voltage at terminal 102 which is impressed across the voltage divider 90–92 in reference to ground now being applied at terminal 100. This resulting voltage is represented by pulse A of FIGURE 3. It can be seen that when the voltage across the secondary of transformer 44 changes to the opposite sign, pulse A disappears and there is again an algebraic cancellation of voltages occurring at terminal 102 and the voltage divider resistors 90 and 92. With the existence of pulse A at terminal 102, a similar pulse of lower magnitude is developed at terminal 93 represented by pulse B which operatively charges capacitor 94, which accordingly controls meter 96. Since the magnitudes of pulses A and B are predetermined and constant, the energy content thereof depends solely upon the pulse width which directly corresponds to the phase displacement between the signals at transformers 44 and 45.

Beginning with 180°, the voltage across secondary of transformer 80 changes sign so as to actuate rectifier stage 106 and deactivate rectifier stage 104. Therefore, although a negative pulse would be developed at terminal 102 between 180° and 360°, such a pulse does not result due to rectifier stage 106 placing ground potential at terminal 102 during this time period. It can be seen, however, that a positive pulse does develop at terminal 100 which is represented as pulse C in FIGURE 3. Pulse C is impressed across the voltage divider resistors 90 and 92 to ground and at terminal 93 there develops another output pulse D which also serves to charge capacitor 94. Since the resistors 90–92 have equal value, pulse D has the same magnitude as pulse B and since the phase displacement between the sampled signals is the same, from zero to 360°, pulse D has the same width as pulse B. Beginning with 360°, the signal at the secondary of transformer 80 reverses in sign so as to actuate rectifier stage 104 and deactivate rectifier stage 106. The above-described action continues so long as transformers 12 and 14 continue to receive signals. In this manner, the synchronous phase detector according to the invention continues to charge capacitor 94 with constant amplitude pulses at time duration proportionate to the phase lag of the signal at transformer 44 relative to the signal at transformer 45. In the event the signal at transformer 44 leads the signal at transformer 45, the action of the synchronous phase detector according to the invention is the same as described above; however, the pulses developed at terminals 100, 102 and 93 would be negative in sign instead of positive. Thus, the indication at meter 96 not only shows the magnitude of the phase displacement but also whether the phase deviation is a lag or lead.

One embodiment of the dynamic impedance analyzer according to this invention has particular utility for monitoring the impedance characteristics of a line load. Basically, sampled voltaging current wave forms, each related to the other, by virtue of being the voltage across a load and the resultant current therein, are analyzed to ascertain the impedance characteristics of the load. This analysis is accomplished by dividing, on a dynamic basis, the rectified line voltage by the rectified line current to obtain the magnitude of line impedance and at the same time developing an output signal indicative of the relative phase displacement between the sampled current and sampled voltage so as to indicate the capacitive, inductive, or resistive characteristics of the load. Because of the limitations of the conventional analog divider used with the present invention, the signals should be unipolar hence both the line voltage and line current samples are rectified before being presented to the divider. Furthermore, in order to achieve reliable results, the rectified current and voltage signals are applied to the divider in equalized phase relation.

Figure 4:
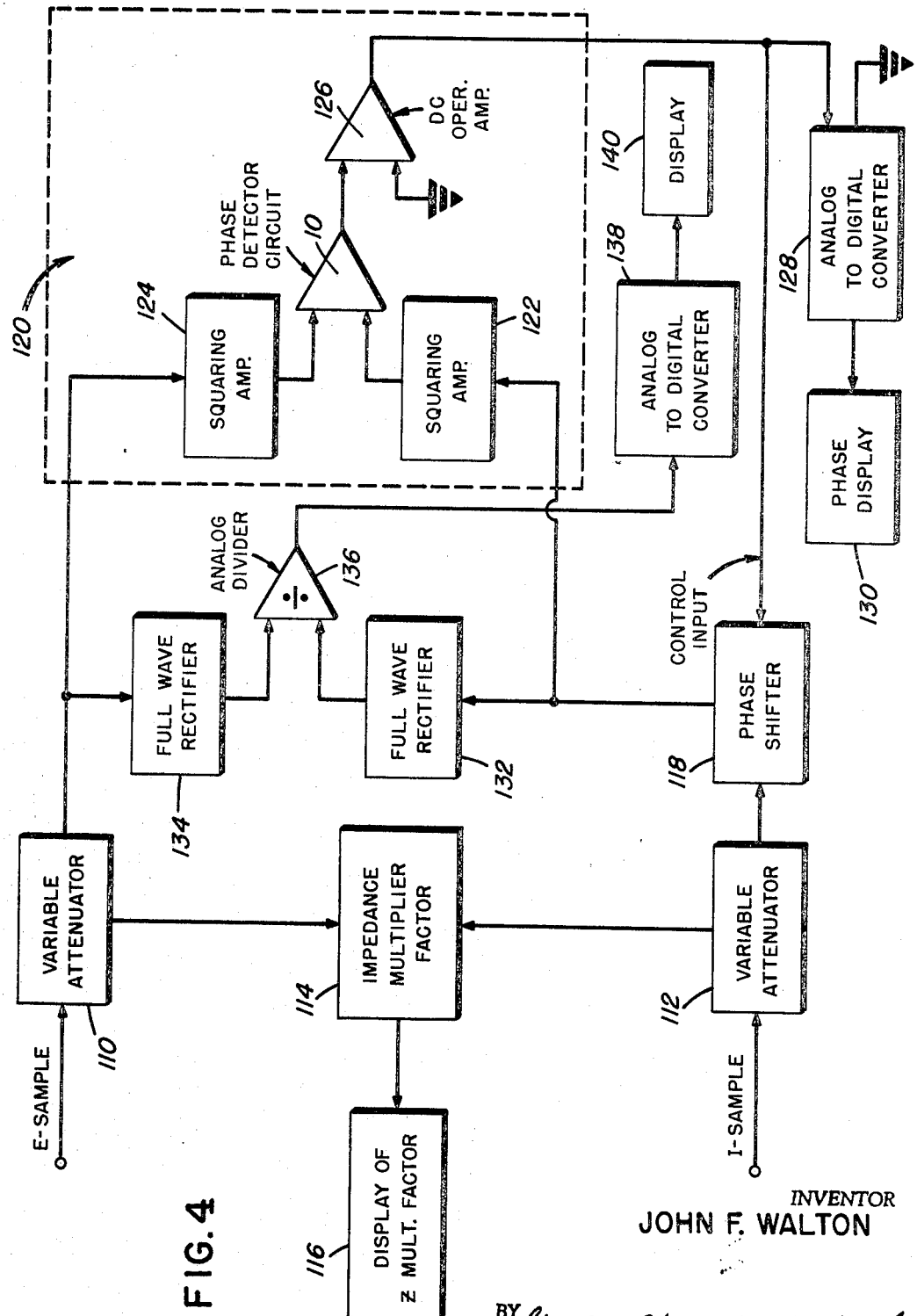
FIGURE 4 is a schematic block diagram of a dynamic impedance analyzer according to the invention.

With reference to FIGURE 4, signals representative of line current and voltage are developed by conventional sampling probes or the like. The sampled voltage is applied to variable attenuator 110 and a signal representative of sampled current is applied to variable attenuator 112. Attenuators 110 and 112 are provided for securing suitable signal input levels to the divider. The attenuators also control a conventional impedance multipler factor circuit 114 which develops signals representative of the attenuator settings and apply these signals to a display device 116. Assuming the sampled voltage signal is designated as a reference, the output of the variable attenuator 112 is fed to a phase shifter 118 capable of shifting the phase of the sampled current signal in the lag or lead direction relative to the sampled voltage signal. Phase shifter 118 is continuously controlled by phase comparator circuit 120 which continuously receives the sampled voltage and current signals from variable attenuator 110 and the output of phase shifter 118. The phase comparator circuit 120 develops a varying DC which is reapplied to phase shifter 118 and which is related in magnitude and sign to the phase displacement between the sampled voltage and current signals.

Figure 5:
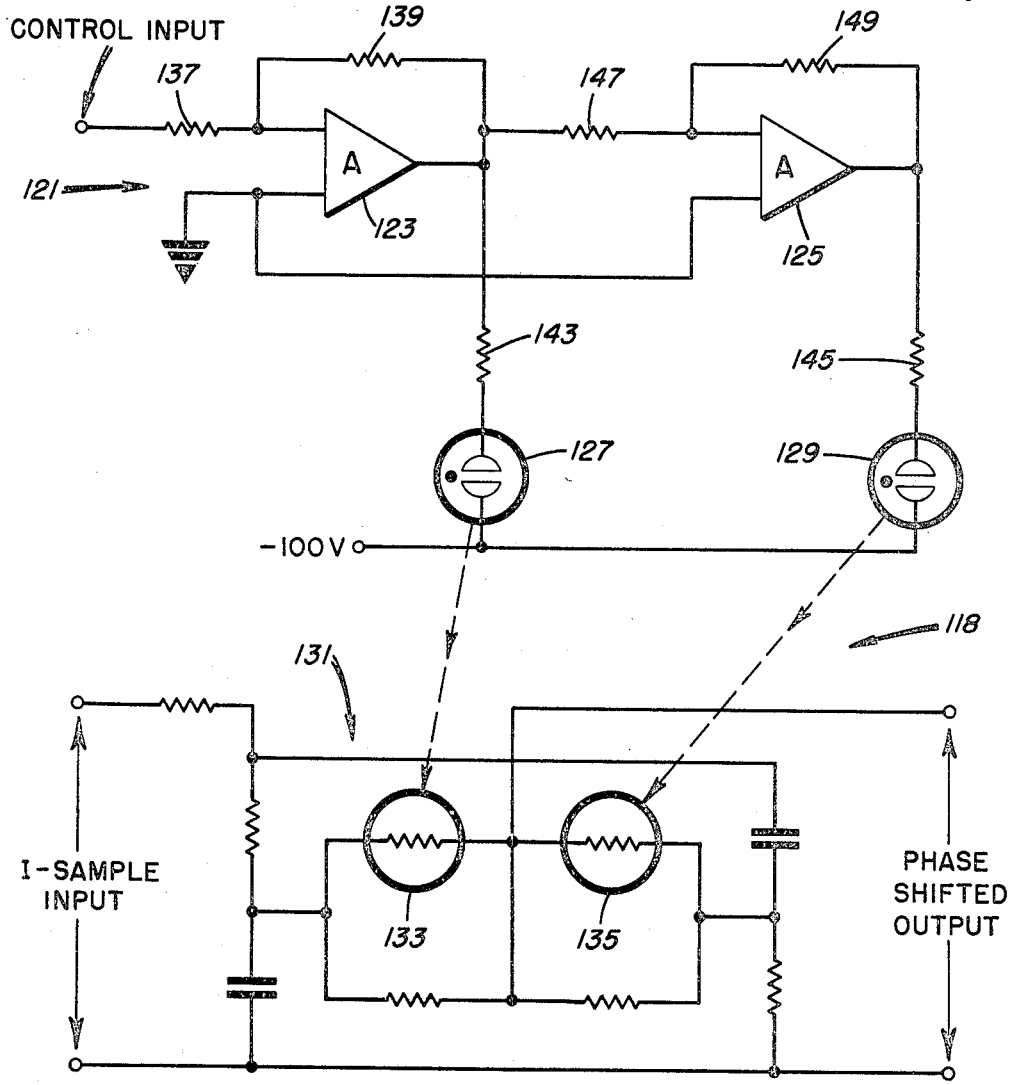
FIGURE 5 is a schematic illustration of a phase shifter forming a part of the analyzer of FIGURE 4.
Figure 6:
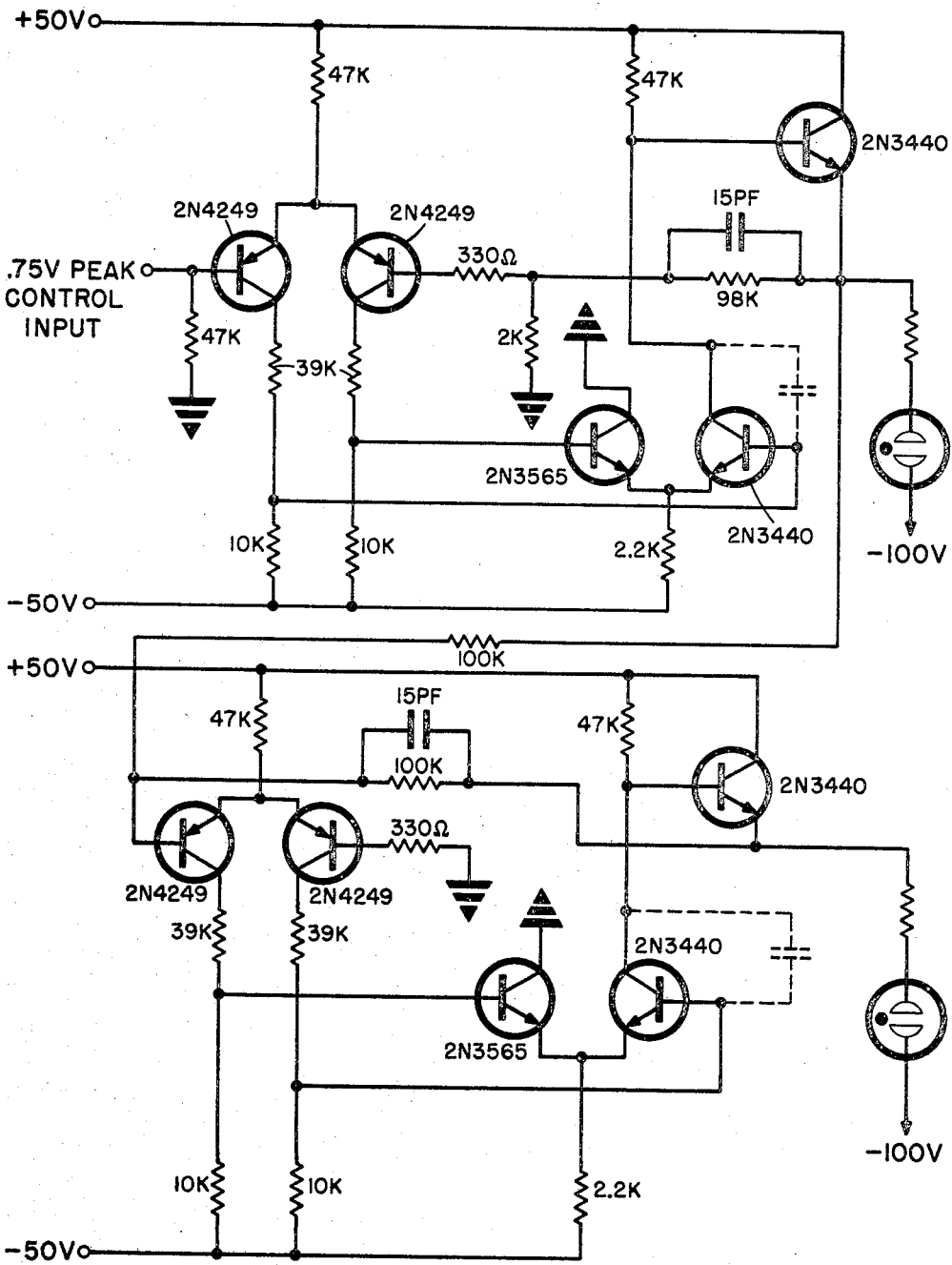
FIGURE 6 is a detailed schematic illustration of the amplifiers of FIGURE 5.

A suitable phase shifter is illustrated in FIGURES 5 and 6 for an exampled input signal at 60 c.p.s. The degree and direction of phase displacement of the sampled current signal are controlled by a control input applied at input 119 of a light intensity controlling amplifier circuit 121. Two light controlling operational amplifiers 123 and 125 are connected through current limiting resistors 143 and 145 to control neon lamps 127 and 129 in a stable push-pull manner so that as one lamp brightens, the other darkens. Resistors 143 and 145 set the average intensity for the lamps. Resistors 137 and 139 are chosen so that the gain of the amplifier is 50. Resistors 147 and 149 are chosen so that the gain of their associated amplifier is unity. Therefore, the second amplifier 125 functions as a unity gain amplifier and uses the output of amplifier 123 as a source. The output of amplifier 125 is equal in amplitude but inverted the output of amplifier 123. FIGURE 6 details the circuitry of amplifiers 123 and 125. It is preferred that the control input be less than one volt peak since a 40 volt variation plus or minus is suitable control on the lamp. The phase shifting network 131 includes a pair of photo resistors 133 and 135 which receive light from lamps 127 and 129. This arrangement provides push-pull control for network 131 and achieves minimum variation in amplitude of the phase shifted output signal from one extreme to the other.

As seen in FIGURE 4, the outputs of phase shifter 118 and variable attenuator 110 are applied to squaring and clipping amplifiers 122 and 124. The outputs of amplifiers 122 and 124 are constant amplitude square wave pulses having the same period and possibly displaced in phase. The outputs of these amplifiers are applied as inputs to the phase detector circuit 10, as described above and as representative of FIGURE 1 herein. The output of synchronous phase rectifier 10 is preferably an integrated output in the form of varying DC and is applied to a DC operational amplifier the output of which is fed back to the control input 119 of phase shifter 118. With this control, phase shifter 118 shifts the sampled current signal in the lag or lead direction depending on the sign of the output of amplifier 126 and by an amount dependent upon the output magnitude of amplifier 126. In this way, a null balance system is thus formed which tends always to minimize the error voltage present at the output of the operational amplifier 126. In so doing, however, the phase shifter 118 must equalize the two phases so that the output of the synchronous phase detector 10 is at a near zero level which condition corresponds to balance. Although the magnitude of the output of amplifier 126 is representative of the initial phase displacement, this relationship is not linear. The non-linear relationship therebetween is due to the transfer characteristics of the phase shifter 118. However, this non-linearity may be compensated in the analog-to-digital converter 128 which receives the output signal from amplifier 126 and applies a digital signal to the phase display apparatus 130.

With the outputs of phase shifter 118 and variable attenuator 110 in phase, the same are fed to full wave rectifiers 132 and 134 respectively. After rectification the signals are applied with the same polarity to an analog divider 136, of conventional design, which may apply the output signal to a visual display device such as an analog-to-digital converter 138 and digital display apparatus 140. Thus, the magnitude of the line impedance and the magnitude and sign of phase deviation are quickly and reliably displayed to the operator.

An alternate arrangement of the impedance analyzer is illustrated in FIGURE 7 wherein synchronous phase detectors 10a and 10b have a design according to the present invention illustrated in FIGURE 1 herein. Square wave and clipping amplifiers 122 and 124 together with synchronous phase detector 10a and high gain DC operational amplifier 126 cooperate to develop the control voltage for controlling phase shifter 118. The high gain of the operation amplifier 126 eliminates any effective non-linearity in the transfer function of phase shifter 118.

The operation of the embodiment of FIGURE 7 will be understood from the foregoing. The outputs of divider 136 and detector 10b may be applied to converters and display devices as illustrated in FIGURE 4. It can be seen that an additional squaring and clipping amplifier 142 is provided to develop a square wave similar to the one developed by amplifier 124 but having a phase determined by the sampled current. The outputs of amplifiers 124 and 142 are applied to phase detector 10b which provides a phase output signal.

FIGURE 8 illustrates still another embodiment of the impedance analyzer. Instead of developing phase equalized signals for the divider, the two sample and store gates 150 and 152 are provided each being actuated synchronously with the associated sampled voltage or current signal by line synchronous gate controllers 154 and 156. Controllers 154 and 156 are pre-adjusted to sense the peak signal during each half cycle and actuate the respective gate substantially when peak value occurs. The gated rectified sample charges the associated capacitor 158 and 160 where the sampled level is maintained until the next "gating" when the stored level is adjusted up or down depending on the new sample. In this way, relatively smooth DC signals are provided at the divider inputs so that phase equalization is unnecessary. Input signal levels can be adjusted more closely to their optimum level and there is less noise on the divider output terminal. Measurement of the phase angle is accomplished by phase detector 10b as mentioned above. It should be pointed out that the sample of current or voltage signal does not have to be taken at the peak of the waveform, but may be taken at any suitable point on the wave forms. Because phase shifting is not involved, a larger angle of deviation at the divider inputs is tolerable, almost 90° lead or lag, without seriously affecting the divider accuracy.

What is claimed is:

1. A dynamic impedance analyzer for rapidly indicating impedance characteristics of line conditions, electrical elements, or the like, comprising an analog divider means having a sampled voltage input and a sampled current signal input for dividing the sampled voltage signal by the sampled current signal and producing a signal proportionate thereto, each signal being representative of current and voltage associated with said impedance, first rectifying means for receiving and rectifying one of the sampled signals and applying the rectified signal to one of the divider means inputs, phase shifter means for receiving the other sampled signal including a control input to receive a phase control signal for shifting the phase of the received sampled signal at the output of the phase shifter means, phase comparator means receiving the first-mentioned sampled signal and the output signal of said phase shifter means for developing a phase shift control signal and applying said phase shift control signal to the control input of the said phase shifting means to control the same so that the output of the phase shifting means is in phase with the first-mentioned sampled signal, second rectifying means for receiving and rectifying with the same polarity as the first rectifying means the output of said phase shifting means and applying its output to the other input of said divider, said phase comparator means including a synchronous phase detector for developing a signal representative of the phase deviation between two equal period sampled signals including first and second terminals, first and second means connected to said first and second terminals, respectively, each for receiving one of said sampled signals and developing a square wave signal of constant, predetermined amplitude equal to the square wave signal developed by the other of said first and second means, one of said square wave signals being in phase with the corresponding sampled signal and the other being in half period phase displacement relative to the corresponding sampled signal, said first and second means applying the square waves for algebraic addition between said first and second terminal, a voltage divider coupled from said first to said second terminal having serial sections with an output terminal connected to the interconnection thereof, the voltage value developed by each section being substantially equal for a given voltage imparted across said first and second terminals, first switch means connected to said first terminal for selectively placing a predetermined potential at said first terminal, second switch means connected to said second terminal for placing the same predetermined potential at said second terminal, and third means for alternately actuating said first and second switch means every one-half sampled period beginning with a time relation approximating one-quarter cycle after an axis crossing of one of the square wave signals developed by said first and second means, so that the power content of the phase detector output pulses represents the phase deviation between the sampled signals and the sign of the output pulses indicates the lead or lag deviation characteristic relative to said one of the square waves and the power content of the analog divider output signals represent the value of said impedance.

2. A dynamic impedance analyzer as set forth in claim 1 including means for integrating the output of said synchronous phase detector, and a DC operational amplifier with its input receiving the integrated output of said phase detector and its output connected to said phase shift control input of said phase shifting means.

3. A dynamic impedance analyzer as set forth in claim 2 wherein first indicating means are connected to the output of the divider means to indicate the magnitude of the division and second indicating means are connected to the output of said DC operational amplifier to indicate the magnitude and sign of phase deviation between the sampled signals.

4. A dynamic impedance analyzer as set forth in claim 2 comprising a further synchronous phase detector as stated receiving the sampled signals to develop an output signal indicative of the magnitude and sign of phase displacement therebetween and first indicating means connected to the output of said divider means for indicating the magnitude of the division and second indicating means connected to the output of said further synchronous phase detector for indicating the magnitude and sign of phase displacement.

5. A dynamic impedance analyzer for rapidly indicating impedance characteristics of line conditions, electric elements or the like, comprising an analog divider means having a pair of input terminals, means for receiving a pair of sampled signals representative of current and voltage associated with said impedance, has means for continuously storing at each input of the divider means the last occurring peak voltage for different ones of the sampled signals so as to provide the input signal values for the division, and phase comparator means for receiving the sampled signals and developing a signal indicative of the magnitude and sign of the phase deviation between the sampled signals, said phase comparator comprising a synchronous phase detector for developing a signal representative of the phase deviation between the two equal period sampled signals including first and second terminals, first and second means connected to said first and second terminals, respectively, each for receiving one of said sampled signals and developing a square wave signal of constant, predetermined amplitude equal to the square wave signal amplitude developed by the other of said first and second means, one of said square wave signals being in phase with the corresponding sampled signal and the other being in half period phase displacement relative to the corresponding sampled signal, said first and second means applying the square waves for algebraic addition between said first and second terminal, a voltage divider coupled from said first to said second terminal having serial sections with an output terminal connected to the interconnection thereof, the voltage value developed by each section being substantially equal for a given voltage imparted across said first and second terminals, first switch means connected to said first terminal for selectively placing a predetermined potential at said first terminal, second switch means connected to said second terminal for placing the same predetermined potential at said second terminal, and third means for alternately actuating said first and second switch means every one-half sampled period beginning with a time relation approximating one-quarter cycle after an axis crossing of one of the square wave signals developed by said first and second means, so that the power content of the phase detector output pulses represent the phase deviation between the sampled signals and the sign of the output pulses indicates the lead or lag deviation characteristic relative to said one of the square waves and the power content of the analog divider output signals represent the value of said impedance, and first indicating means connected to display the magnitude of the output signal of the divider means and second indicating means connected to display the magnitude and sign of the output signal of the synchronous phase detector.

References Cited
UNITED STATES PATENTS

| | | |
|---|---|---|
| 3,090,913 | 5/1963 | Boyer _____ 324—57 |
| 3,238,450 | 3/1966 | Palmer _____ 324—57 X |
| 3,260,936 | 7/1966 | Hewlett et al. _____ 324—57 |

EDWARD E. KUBASIEWICZ, Primary Examiner

U.S. Cl. X.R.
324—83